United States Patent
Corma et al.

(10) Patent No.: US 8,901,363 B2
(45) Date of Patent: Dec. 2, 2014

(54) ALKENE OLIGOMERIZATION PROCESS

(75) Inventors: Avelino Corma, Valenica (ES); Cristina Martinez, Valencia (ES); Eric J. Doskocil, Oswego, IL (US); George Yaluris, Naperville, IL (US)

(73) Assignee: BP Corporation North America Inc., Houston, TX (US)

( * ) Notice: Subject to any disclaimer, the term of this patent is extended or adjusted under 35 U.S.C. 154(b) by 321 days.

(21) Appl. No.: 13/101,247

(22) Filed: May 5, 2011

(65) Prior Publication Data

US 2011/0282123 A1    Nov. 17, 2011

(30) Foreign Application Priority Data

May 14, 2010   (EP) .................................... 10382124

(51) Int. Cl.
| | |
|---|---|
| *C07C 2/12* | (2006.01) |
| *B01J 29/70* | (2006.01) |
| *B01J 37/30* | (2006.01) |
| *C10G 50/00* | (2006.01) |
| *C10L 1/08* | (2006.01) |

(52) U.S. Cl.
CPC ...... *B01J 29/70* (2013.01); *B01J 37/30* (2013.01); *C10G 50/00* (2013.01); *C10L 1/08* (2013.01); *B01J 2229/186* (2013.01); *C10G 2300/4018* (2013.01); *C10G 2300/1088* (2013.01); *C10G 2400/04* (2013.01)
USPC ........... 585/533; 585/520; 585/530; 585/532; 502/77; 502/85; 502/86

(58) Field of Classification Search
USPC ........ 502/77, 85, 86; 585/502, 520, 530, 532, 585/533
See application file for complete search history.

(56) References Cited

U.S. PATENT DOCUMENTS

| | | | | |
|---|---|---|---|---|
| 4,227,992 A | * | 10/1980 | Garwood et al. | ............... 208/46 |
| 4,556,477 A | * | 12/1985 | Dwyer | ..................... 208/111.15 |
| 4,675,460 A | * | 6/1987 | Seddon et al. | ................ 585/329 |
| 5,080,878 A | * | 1/1992 | Bowes et al. | ................. 423/713 |
| 5,284,989 A | * | 2/1994 | Apelian et al. | ................ 585/533 |
| 7,271,304 B2 | * | 9/2007 | Du Toit | ......................... 585/329 |
| 2005/0182284 A1 | * | 8/2005 | Stanat et al. | ................. 585/535 |
| 2008/0139860 A1 | | 6/2008 | Simon et al. | |
| 2009/0093663 A1 | | 4/2009 | Cheng et al. | |

FOREIGN PATENT DOCUMENTS

| | | |
|---|---|---|
| CN | 101213144 A | 7/2008 |
| WO | 2005118512 A1 | 12/2005 |

OTHER PUBLICATIONS

"Framework Type MTW" in Database of Zeolite Structures, available at www.iza-structure.org, accessed Jun. 14, 2013.*
Speight, "Refinery Processes" in Kirk-Othmer Encyclopedia of Chemical Technology, J. Wiley & Sons, 1996, p. 433-469—month unknown.*
"Framework Type MFI" in Database of Zeolite Structures, available at www.iza-structure.org, accessed Jun. 14, 2013.*

* cited by examiner

*Primary Examiner* — Prem C Singh
*Assistant Examiner* — Bradley Etherton
(74) *Attorney, Agent, or Firm* — Kelly L. Cummings (57) ABSTRACT

Disclosed is a process for producing a hydrocarbon fraction rich in components boiling in the range typical for diesel fuel comprising contacting a feedstock comprising one or more $C_2$ to $C_{10}$ alkenes with a zeolite catalyst having partially neutralised acidity and a one-dimensional or two dimensional micropore structure consisting of channels made from rings containing between 10 and 12 silicon/aluminium atoms at a temperature in the range 373 to 773 K and pressure in the range 0.1 to 200 bar characterised in that the partially neutralized zeolite catalyst contains both protons and basic cations. The basic cations are preferably selected from the group comprising Group IA and IIA cations (preferably sodium, potassium, caesium or mixtures thereof). Relative to their equivalent fully protonic forms the partially neutralized zeolite catalysts described show improved catalyst life and selectivity to hydrocarbons.

6 Claims, 6 Drawing Sheets

FIGURE 1

Naphtha: $C_5$-446.9 K
Diesel: 446.9-664.1 K
Heavy fraction: 664.1-1273 K

Naphtha: $C_5$-446.9 K
Diesel: 446.9-664.1 K
Heavy fraction: 664.1-1273 K

Naphtha: C$_5$-446.9 K
Diesel: 446.9-664.1 K
Heavy fraction: 664.1-1273 K

FIGURE 6

ALKENE OLIGOMERIZATION PROCESS

This application claims priority to European Patent Application No. 10382124.5, filed May 14, 2010, which is incorporated herein by reference.

FIELD OF INVENTION

The present invention relates to a heterogeneous process for oligomerizing alkenes to produce a hydrocarbon fraction suitable for use as diesel fuel. In particular the present invention relates to process which employs as catalyst an MFI or TON type zeolite, most preferably a theta-one (TON) type zeolite, with partially neutralised acidity.

BACKGROUND OF INVENTION

The oligomerization of light alkenes, such as propene and butenes, represents an important industrial route to the production of environmentally friendly synthetic liquid fuels, free of sulphur and aromatics. These processes allow the production of olefinic mixtures in the boiling range of gasoline or diesel depending on the exact nature of the catalyst and its operating conditions. For example it is known that high temperatures (>300° C.) and low pressures (≤30 bar) will increase the gasoline yield, whereas lower temperatures and higher pressures will favour the formation of heavier oligomers in the diesel fraction.

The oligomerization of lower alkenes into a diesel range product is typically acid catalysed through a reaction mechanism which is thought to involve highly reactive carbenium ions which generate both linear and branched hydrocarbon products. In order to obtain a high quality product however the degree of branching needs to be restricted. Two strategies have been suggested in the art to achieve this: control and modification of the site of catalysis in the catalyst (e.g. the strength of its acidity or the nature of its local environment), and use of particular zeolite catalysts whose micropore structure confers "shape selectivity" on the oligomerization process thereby influencing the relative kinetics of straight and branched chain growth.

Medium pore zeolites of the pentasil type have been described as suitable for obtaining high quality middle distillates with minimal branching. For example U.S. Pat. No. 4,227,992 and U.S. Pat. No. 4,211,640 teach zeolite ZSM-11 as a catalyst for olefin oligomerization processes, and mention others such as ZSM-12, ZSM-21 and TEA mordenite. GB2106131 and GB2106533 disclose the use of ZSM-5 and ZSM-11 for oligomerization of gaseous olefins and teach that a selectivity of 25 wt % to a diesel product with cetane index of 75 can be obtained when the hydrogen form of the zeolite is used.

U.S. Pat. No. 5,234,875 discloses a coked ZSM-23 yielding a considerably less branched product than its unmodified counterpart. In U.S. Pat. No. 5,284,989 three medium pore zeolites, ZSM-22, -23 and -35, were treated with a dicarboxylic acid to inactivate their surface acidity with the aim of producing substantially linear hydrocarbons by oligomerizing propylene.

Several patents (WO95/19945; WO95/22516; U.S. Pat. No. 6,143,942) claim the use of different medium pore zeolites, such as ZSM-22, ZSM-57, ZSM-5, alone or in admixtures, to oligomerize light olefins and in WO93/082780 a ZSM-23 zeolite treated with collidine to deactivate 25-30% of the acid sites, showed a reduction in branching in the product.

FR2887538A1 describes the use of different zeolites, MEL, ITH, MFI, NES, EUO, ERI, FER, CHA, MFS, MWW, MTT, TON and MOR, which have been first dealuminated in a first step followed by treatment with a silicon compound and finally converted to the hydrogen form.

FR2894850A1 describes the use of modified MEL, ITH, MFI, NES, EUO, ERI, FER, CHA, MFS, MWW, MTT, TON and MOR zeolites as catalysts in an oligomerization process to obtain diesel or jet fuel. The catalysts are prepared by impregnating the zeolite with Group VIB and VIII metals followed by gas phase deposition of amorphous SiO2. The final catalysts are used in their acid form.

It has now been found that TON zeolites which have partially neutralised acidity show improved catalyst lifetime and selectivity to diesel-range hydrocarbons when used as olefin oligomerization catalysts.

According to the present invention there is provided a process for producing a hydrocarbon fraction containing components boiling in the range typical for diesel fuel comprising contacting a feedstock comprising one or more $C_2$ to $C_{10}$ alkenes with a zeolite catalyst having partially neutralized acidity and a one-dimensional or two-dimensional micropore structure, preferably a one-dimensional micropore structure, consisting of channels made from rings containing between 10 and 12 silicon/aluminium atoms, at a temperature in the range 373 to 773 K and pressure in the range 0.1 to 200 bar, characterised in that the zeolite catalyst contains both protons and basic cations.

The alkene feedstock employed in the process of the present invention comprises one or more $C_2$ to $C_{10}$ hydrocarbons preferably one or more $C_3$ to $C_7$ alkenes. These olefins can be used pure or in mixtures with more other components such as alkanes, e.g. n-propane, n-butane or n-pentane, or an inert gas, such as nitrogen. In such cases the alkenes should comprise between 10% and up to 100% by weight of the mixture preferably from 25% and up to 100%. The alkene feedstock can be derived from any source including crude oil, natural gas, bio-feedstocks and conversion technologies such as Fischer-Tropsch and other Gas to Liquids technologies. The feedstock may also desirably contain hydrogen preferably at a level of from 0.1 to 80 molar percent of the total feedstock, preferably in a range from 0.5 to 50 molar percent.

In a preferred embodiment the feedstock may be at least partly derived from a refining process, e.g. the LPG product of a catalytic cracking process or the product of a Fischer-Tropsch unit or a biofuels processing unit or from a methanol to liquid hydrocarbons plant.

The oligomerization process itself is suitably carried out continuously either by passing the feedstock through a fixed bed comprising the partially neutralized zeolite catalyst or by bringing both the feedstock and the partially neutralized zeolite catalyst together in a moving or fluidised bed. In the former case the fixed bed reactor configuration can include any of the known configurations, such as multiple fixed reactors operating in parallel allowing some reactors to operate while others are in catalyst regeneration mode. In the latter case the bed may also be configured to allow catalyst removal from the reaction zone and recycle for regeneration purposes. Suitably the oligomerization process is carried out at a temperature from 373 to 773 K, preferably 393 to 673 K, especially 423 to 623 K. Suitably a pressure from 0.1 to 200 bar, preferably 2 to 150 bar, most preferably 5 to 80 bar may be used. The weight hourly space velocity WHSV of the feedstock over the zeolite catalyst is suitably in the range of 0.1-100 $h^{-1}$, preferably in the range of 0.25 to 50 $h^{-1}$.

The hydrocarbon fraction produced by the process of the present invention will suitably comprise greater than 10% by weight, preferably greater than 35%, most preferably greater than 50% by weight of components boiling under atmospheric conditions in the range typical for diesel fuels (400 to 700 K), preferably from C10 to C24 (447 to 664 K). The hydrocarbon fraction which is the product of the oligomerization process described herein may be subject to further downstream treatment e.g. fractional distillation to recover pure diesel fuel.

The zeolites which form the precursors to those partially neutralized zeolite catalysts used in the process of the present invention are those having a microporous structure comprised of ten or twelve ring channels. Suitable examples are those whose crystalline structure belongs to one of the following IUPAC framework types TON (Theta-1, Nu-10, ZSM-22, KZ-2; ISI-1), MTT (ZSM-23, EU-13, ISI-4, KZ-1), EUO (EU-1, TP2-3, ZSM-50) AEL (SAPO-11), FER (ferrierite, FU-9, Nu-23, ISI-6, ZSM-35), MFS (ZSM-57), ITH (ITQ-13), IMF (IM-5), MFI (ZSM-5) and MEL (ZSM-11) and ZSM-12. Other zeolites which can be used include NES (NU-87), MWW (MCM-22, ITQ-1, SSZ-25), STI (Stilbite, NT-10, SSZ-75), SFF (SSZ-44), STF (SSZ-35, ITQ-9), (TER) Terravonaite, LAU (Laumontite), ITH (ITQ-13), IMF (IM-5), TNU (TNU-9, TNU-10). Further information on these structure types can be found in the Atlas of Zeolite Framework Types (C. Baerlocher, W. M. Meier, D. H., Olson. $5^{th}$ ed. Elsevier, Amsterdam, 2001) or the web-based version thereof. All the above-mentioned zeolites can be prepared by established methods known in the art. In one preferred embodiment of the invention the zeolite is of the MFI structure type. In another the zeolite is one having a one-dimensional micropore structure especially those of the TON structure type which are most preferred.

Preferably the zeolite catalysts of the present invention are characterised by crystallites having additional significant mesoporosity which provide further access to the interior of the crystallites. This mesoporosity manifests itself as pore volumes in the range 0.09 to 0.25 $ml^3g^{-1}$ preferably 0.12 to 0.25 $ml^3g^{-1}$ as measured by nitrogen absorption at 77° K and calculated on the basis of an analysis of the isotherms so obtained using the Barrett-Joyner-Halenda (BJH) method. Details of this method can be found in J. Amer. Chem. Soc. (1951) 73 373-380.

Another general feature of the modified zeolite catalysts of the present invention which is apparent from electron microscopy is that they have a crystallite morphology which is relatively speaking dimensionally isotropic. In practical terms this means that the average ratio of the crystallite dimensions X and Y where X is the dimension along the axis parallel to the direction of the micropores and Y is the dimension along either of the other two axes perpendicular thereto is less than 4:1, preferably less than 3:1 and most preferably less than 2:1.

Typically the zeolite used has a silicon to aluminium ratio of between 15:1 and 250:1, preferably between 20:1 and 200:1 and most preferably between 25:1 and 150:1.

It is a feature of the present invention that rather than using a form of the zeolite in which essentially all of the exchangeable cationic sites are occupied by protons, a partially neutralised form is employed where part of these exchangeable sites are occupied by basic cations, preferably selected from the Group IA or Group IIA metal cations. The amount of basic cations is suitably such that from 1 to 99% of the exchangeable sites are replaced by such cations (on a molar basis), preferably 2 to 95% more preferably 3 to 90% and most preferably 10 to 85% with optimum neutralization levels being dependent upon the silicon to aluminium ratio of the parent zeolite and upon the selected basic cation. The basic cations can be added during the zeolite synthesis procedure or can be added by post-synthesis treatments well-known in the art. Preferably the basic cations employed are the cations of lithium, sodium, potassium, rubidium, caesium or mixtures thereof, most preferably sodium, potassium, caesium or mixtures thereof.

Although the preferred catalytically active form of the partially neutralized zeolite catalyst contains a mixture of protons and basic cations, it can further incorporate other cations too. Such extra cations may in principle be any other stable metal or organic cation but those of V, Cr, Mn, Fe, Co, Ni, Cu, Zn, Mo, W, Y Ti, Ga, the rare earths (e.g. Ce and La) and ammonium ion are preferred.

The partially neutralized zeolite catalysts of the present invention can be generated by any of the well-known methods in the art. For example, it is not uncommon in the synthesis of the zeolites of the present invention for them to be synthesised in a form which contains both organic-ammonium and alkaline cations. In such a case all that may be required is for the 'as synthesised' material to be calcined thereby driving off organic base and creating Bronsted (protonic) acidity. Alternatively the zeolite may be synthesised or obtained in a fully-exchanged alkaline cation form and then converted into a partially acidic form by partial ammonium ion exchange followed by calcination. Or an 'as synthesised' zeolite may be first fully converted into the ammonium or proton form and then back-exchanged with the required amount of alkaline cation. In the case of zeolite catalysts also containing the other cations referred to above these can be introduced by sequential partial exchange or simultaneous exchange using a solution containing all the various cations required.

If desired, the partially neutralized zeolite catalyst can also be subsequently treated with a surface-modification agent such as a dicarboxylic acid, such as oxalic acid, a bulky organic molecule, (see for example U.S. Pat. No. 4,520,221 and U.S. Pat. No. 4,568,786), such as collidine, or bulky chelating/sequestering agents such as aminocarboxylates (e.g. EDTA, diethylenetriamine pentaacetic acid, hydroxyethylethylene diamine triacetate) and aminophosphates or aminophosphonates (e.g. aminotrimethylene phosphate, ethylenediamine tetramethylene phosphonate) or a hexahalosilicate salt. The purpose of this surface modification agent which in its active form consists of anions too large to penetrate the micropores of the modified zeolite catalyst, is to remove aluminium from the exterior of the crystallites. Additionally the exterior surface of the partially neutralized zeolite catalyst can be passivated by selective coking or by treatment with silication agents well known in the art, such as silicon tetrachloride or any hexafluorosilicate salt.

If desired, the partially neutralized zeolite catalyst can also be treated after calcination with a surface-modification agent such as a dicarboxylic acid, a bulky organic molecule (see for example U.S. Pat. No. 4,520,221 and U.S. Pat. No. 4,568, 786), such as collidine, or a bulky complexing agents such as EDTA. Additionally the exterior surface of the zeolite catalyst can be passivated by selective coking or by treatment with known silication agents such as silicon tetrachloride or any hexafluorosilicate salt. In a preferred embodiment of the present invention the partially neutralized zeolite catalyst is treated with oxalic acid or a hexafluorosilicate salt before use.

If desired the partially neutralized zeolite catalyst can be formulated with a matrix of one or more metal oxides which are either amorphous or of low crystallinity. In such formulations the matrix may be selected from alumina, silica-alumina, silica, clays, oxides of magnesium, titanium boron, zirconium, vanadium, chromium, molybdenum, manganese, zinc, iron, nickel, cobalt, tungsten, antimony, ceria, lanthanum, and the other readily available rare earths as well as aluminium phosphates, zirconium phosphates, carbon, aluminates and combination of them. Preferably the matrix is comprised of the zeolite catalyst and at least one type of silica, alumina, or silica-alumina. Binding agents typically used in the art can also be employed.

The formulated partially neutralized zeolite catalyst can be formed into any shape useful for industrial-scale duty for example, extrudates, pellets, spheres, spray dried microspheres and the like.

Optionally, the partially neutralized zeolite catalyst may further comprise at least one other metal e.g. Ga, transition metal such as V, Cr, Mn, a hydrogenation metal as those defined in the state of the art as for instance a metal from Group VIII, Cu, Zn, Mo, W, Y, Ti and the rare earths, preferably a Group VIII metal or combination of more than one of them. The incorporation of the Group VIII metal can be carried out by one or more steps of ion exchange, or by impregnation techniques such as the incipient wetness impregnation or in excess of the precursor's solution, all of them well known procedures described in the state of the art. Sources of the Group VIII metals include their corresponding nitrates, sulphates, carbonates or halides.

According to the present invention the formulated partially neutralized zeolite catalyst may comprise additionally at least one promoter, selected from phosphorus, boron and their combinations. This promoter is preferably phosphorus. These promoting elements can be incorporated into the catalyst by any of the well known procedures in the art. In the case of phosphorus, orthophosphoric acid, $H_3PO_4$, monoammonium dihydrogen phosphate (($NH_4$)$H_2PO_4$) or diammonium hydrogen phosphate (($NH_4$)$_2HPO_4$) are preferred.

Optionally the formulated partially neutralized zeolite catalyst described in the present invention can further comprise at least one halogen, preferable fluorine.

Typically a formulated partially neutralized zeolite catalyst will conform to the following specification referred to the total catalyst weight:
  0.1 to 99 wt % of the partially neutralized zeolite catalyst;
  0.1 to 99 wt % of matrix;
  0 to 20% of a hydrogenation metal (e.g. a Group VIII metal).
In a preferred specification, the percentages will be:
  0.5 to 90% of the partially neutralized zeolite catalyst;
  0.1 to 75% of matrix;
  0 to 10% of a hydrogenation metal (e.g. a Group VIII metal).
In a most preferred specification, the percentages will be:
  1 to 85% of the partially neutralized zeolite catalyst;
  0.1 to 60% of matrix;
  0 to 5% of a hydrogenation metal (e.g. a Group VIII metal).

The formulated partially neutralized zeolite catalyst can optionally contain up to 30% preferably up to 20% of other promoters, binding agents and the like.

The present invention will now be further described with reference to the following Figures and Examples.

EXAMPLE 1

A Na,K-Theta-1 (Si/Al=25, Na/Al=0.15, K/Al=0.70, and a crystal size of 200 nm) was exchanged with $NH_4Cl$ to obtain the hydrogen form using the following procedure: 3 g of zeolite was stirred under reflux for 2 hours in 80 ml of an aqueous solution of $NH_4Cl$ (4.03 g $NH_4Cl$) at 353 K. Then, the slurry obtained was filtered, washed and dried at 373 K for 12 h. Finally it was calcined for 3 hours at 773 K.

EXAMPLE 2

A Theta-1 zeolite in its hydrogen form (Si/Al=50, and rod type crystallites of 200×800 nm) was exchanged with a 0.016M $NaNO_3$ solution under reflux and vigorous stirring at 353 K for 15 hours, using a solution/solid weight ratio of 10. The solid was then separated by filtration, washed with distilled water and dried at 373 K overnight. Finally the partially exchanged sample was calcined at 773 K for 3 hours. The sample prepared in this way had a 10 molar % of its aluminium (ion-exchange sites) neutralized by Na (Na/Al=0.10).

EXAMPLE 3

A Theta-1 zeolite in its hydrogen form (Si/Al=50, and rod type crystallites of 200×800 nm) was exchanged with a 0.008M $KNO_3$ solution under reflux and vigorous stirring at 353 K for 15 hours, using a solution/solid weight ratio of 10. The solid was then separated by filtration, washed with distilled water and dried at 373 K overnight. Finally the partially exchanged sample was calcined at 773 K for 3 hours. The sample prepared in this way had a 17 molar % of its aluminium neutralized by K (K/Al=0.17).

EXAMPLE 4

A Theta-1 zeolite in its hydrogen form (Si/Al=25, and rod type crystallites of 400×1400 nm) was exchanged with a 0.016M $KNO_3$ solution under reflux and vigorous stirring at 353 K for 15 hours, using a solution/solid weight ratio of 10. The solid was then separated by filtration, washed with distilled water and dried at 373 K overnight. Finally the partially exchanged sample was calcined at 773 K for 3 hours. The sample prepared in this way had a 19 molar % of its aluminium neutralized by K (K/Al=0.19).

EXAMPLE 5

A theta-1 zeolite catalyst with 85 molar % of its aluminium neutralized by alkaline cations (Na,K,H-THETA-1, Si/Al=25, Na/Al=0.15, K/Al=0.70, and a crystal size of 200 nm) was pelletized, crushed and sieved to a particle size of 0.2-0.4 mm. 0.5 g of this pelletized sample was diluted with silicon carbide (0.64 mm-0.25 mm) to obtain a bed volume of 4.0 cm$^3$. The mixture was loaded into a down-flow stainless-steel fixed bed reactor. A $C3^=$:C3 feedstock (60:40 wt:wt) was fed to the reactor as a liquid by means of a Gilson piston pump. During the reaction, the pressure was controlled electronically through a Badger pneumatic valve. The temperature in the catalyst bed was controlled electronically by means of two independent heating zones with the corresponding thermocouples properly placed inside the catalytic bed.

Oligomerization experiments were carried out at a temperature of 473 K, a pressure of 40 bar and WHSV=2.7 h−1 based on the alkene.

Figure 1:
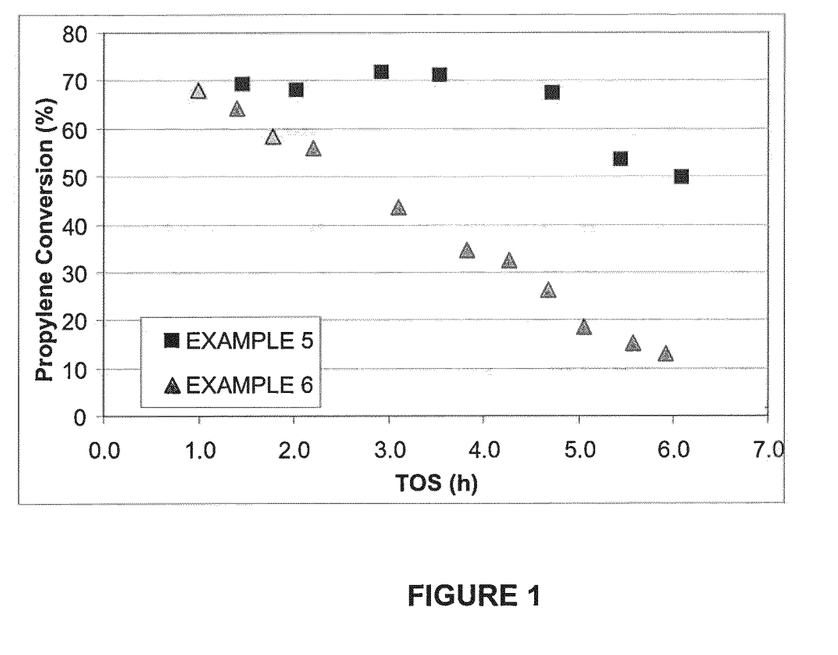
FIG. 1: shows the propylene conversion obtained with the zeolite catalyst described in Example 1, tested as described in Example 6, compared with that of the parent Na,K,H-Theta-1 zeolite (Si/Al=25, Na/Al=0.15, K/Al=0.70) tested as described in Example 5.
Figure 2:
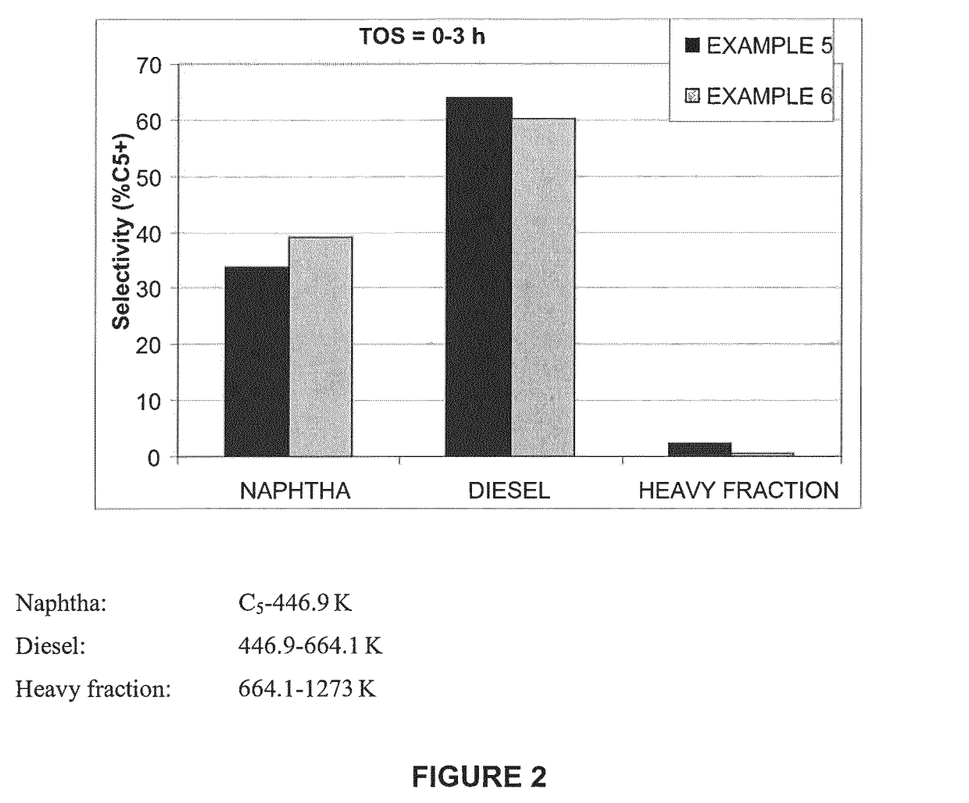
FIG. 2: shows the selectivity to different fractions in liquid products obtained with the zeolite catalyst described in Example 1, tested as described in Example 6, compared with that of the parent Na,K,H-Theta-1 zeolite (Si/Al=25, Na/Al=0.15, K/Al=0.70) tested as described in Example 5.

Variation of propylene conversion with time on stream (TOS) is presented in FIG. 1. The selectivity to different fractions in the liquid product recovered at the outlet of the reactor during the first three hours TOS is shown in FIG. 2.

EXAMPLE 6

The zeolite catalyst prepared as described in Example 1 was pelletized, crushed and sieved to a particle size of 0.2-0.4 mm. 0.5 g of this pelletized sample was diluted with silicon carbide (0.64 mm-0.25 mm) to obtain a bed volume of 4.0 cm$^3$. The mixture was loaded into a down-flow stainless-steel fixed bed reactor, and a $C3^=$:C3 feedstock (60:40 wt:wt) processed as described in Example 5.

Variation of propylene conversion with time on stream (TOS) is compared with that of the alkaline cations containing zeolite in FIG. 1. It can be seen there that the deactivation rate of the zeolite in its hydrogen form (Example 6) is considerably higher than the deactivation rate of the zeolite containing the alkaline cations (Example 5). The selectivity to different fractions in the liquid product recovered at the outlet of the reactor during the first three hours TOS is enclosed in FIG. 2, where it can be seen that the Na,K,H-zeolite catalyst tested in Example 5 is not only more stable towards deactivation, but also more selective to the desired diesel fraction in the $C_{5+}$ product.

EXAMPLE 7

A theta-1 zeolite catalyst in its hydrogen form (Si/Al=50, and rod type crystallites of 200×800 nm) was pelletized, crushed and sieved to a particle size of 0.2-0.4 mm. 0.5 g of this pelletized sample was diluted with silicon carbide (0.64 mm-0.25 mm) to obtain a bed volume of 4.0 cm$^3$. The mixture was loaded into a down-flow stainless-steel fixed bed reactor, and a $C3^=$:C3 feedstock (60:40 wt:wt) processed as described in Example 5.

Figure 3:
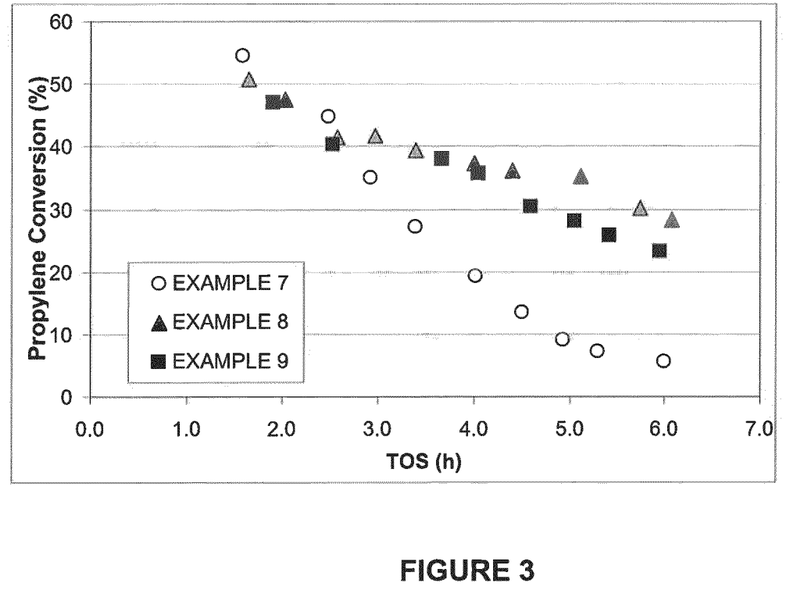
FIG. 3: shows the propylene conversion obtained with the zeolite catalysts described in Examples 2-3, tested as described in Examples 8-9, compared with that of the parent H-Theta-1 zeolite (Si/Al=50) tested as described in Example 7.
Figure 4:
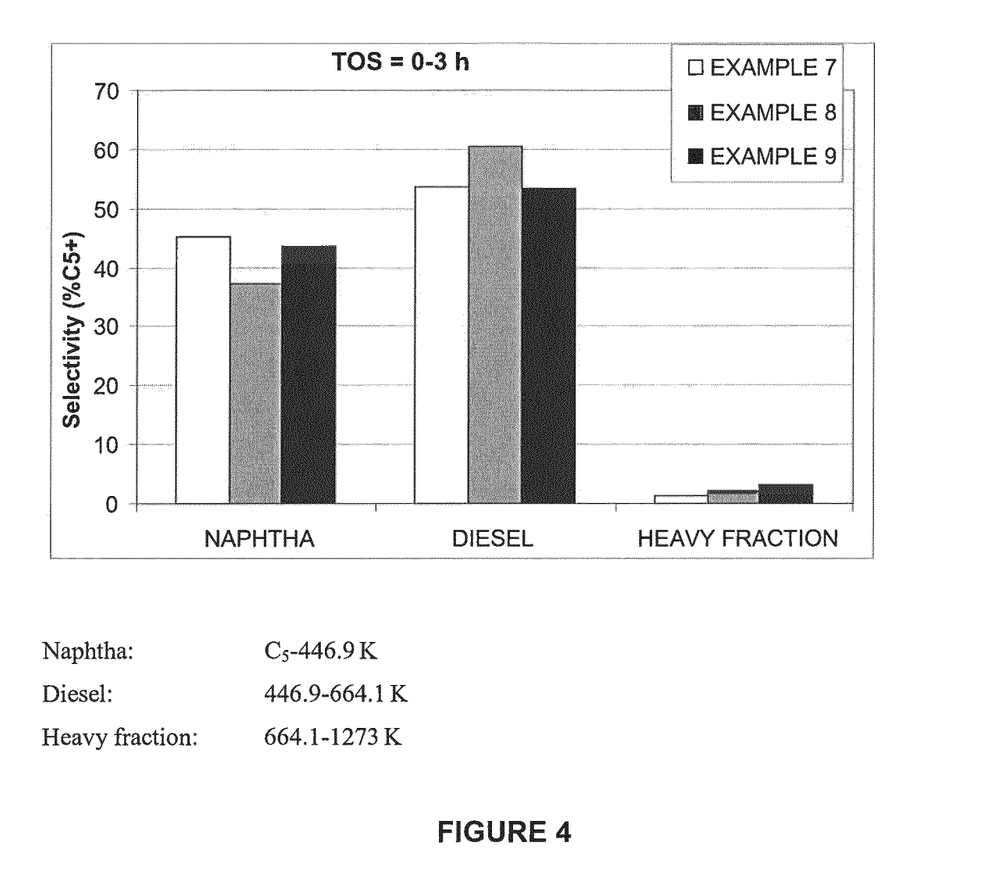
FIG. 4: shows the selectivity to different fractions in liquid products obtained with zeolites described in Examples 2-3, tested as described in Examples 8-9, compared with that of the parent H-Theta-1 zeolite (Si/Al=50) tested as described in Example 7.

Variation of propylene conversion with time on stream (TOS) is shown in FIG. 3. The selectivity to different fractions in the liquid product recovered at the outlet of the reactor during the first three hours TOS is shown in FIG. 4.

EXAMPLE 8

The theta-1 zeolite catalyst of Example 2 was pelletized, crushed and sieved to a particle size of 0.2-0.4 mm. 0.5 g of this pelletized sample was diluted with silicon carbide (0.64 mm-0.25 mm) to obtain a bed volume of 4.0 cm$^3$. The mixture was loaded into a down-flow stainless-steel fixed bed reactor, and a $C3^=$:C3 feedstock (60:40 wt:wt) processed as described in Example 5.

Variation of propylene conversion with time on stream (TOS) is compared with that of the corresponding protonic zeolite in FIG. 3, and it can be seen that when 10 molar % of the proton sites are replaced by sodium the deactivation rate is lower than when the zeolite is fully in its hydrogen form. The selectivity to different fractions in the liquid product recovered at the outlet of the reactor during the first three hours TOS is shown in FIG. 4. This shows that the Na,H-theta-1 tested in this example is more selective to the desired diesel fraction than the parent protonic form.

EXAMPLE 9

The theta-1 zeolite catalyst with 17% of Example 3 was pelletized, crushed and sieved to a particle size of 0.2-0.4 mm. 0.5 g of this pelletized sample was diluted with silicon carbide (0.64 mm-0.25 mm) to obtain a bed volume of 4.0 cm$^3$. The mixture was loaded into a down-flow stainless steel fixed bed reactor, and a $C3^=$:C3 feedstock (60:40 wt:wt) processed as described in Example 5.

The variation of propylene conversion with time on stream (TOS) is compared with that of the corresponding protonic zeolite in FIG. 3, and it can be seen that when 17 molar % of proton sites are replaced by potassium the deactivation rate is lower than when the zeolite is fully in its hydrogen form. The selectivity to different fractions in the liquid product recovered at the outlet of the reactor during the first three hours TOS is enclosed in FIG. 4. These results show that improved catalyst life of the K,H-theta-1 tested in this example is obtained without a loss in the diesel selectivity as compared to the parent protonic form.

EXAMPLE 10

A theta-1 zeolite catalyst in its hydrogen form (Si/Al=25, and rod type crystallites of 400×1400 nm) was pelletized, crushed and sieved to a particle size of 0.2-0.4 mm. 0.5 g of this pelletized sample was diluted with silicon carbide (0.64 mm-0.25 mm) to obtain a bed volume of 4.0 cm$^3$. The mixture was loaded into a down-flow stainless-steel fixed bed reactor, and a $C3^=$:C3 feedstock (60:40 wt:wt) processed as described in Example 5.

Figure 5:
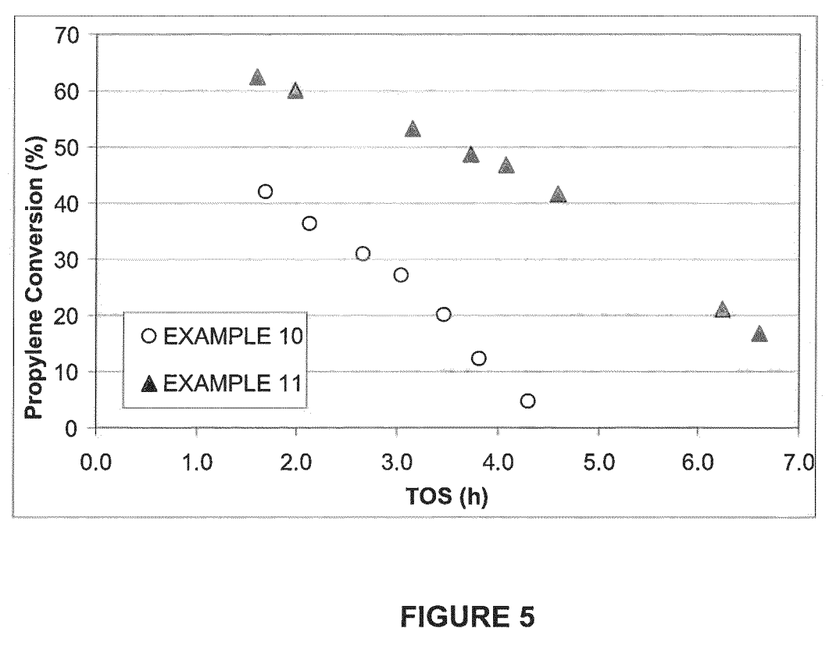
FIG. 5: shows the propylene conversion obtained with the zeolite catalyst described in Example 4, tested as described in Example 11, compared with that of the parent H-Theta-1 zeolite (Si/Al=25) tested as described in Example 10.
Figure 6:
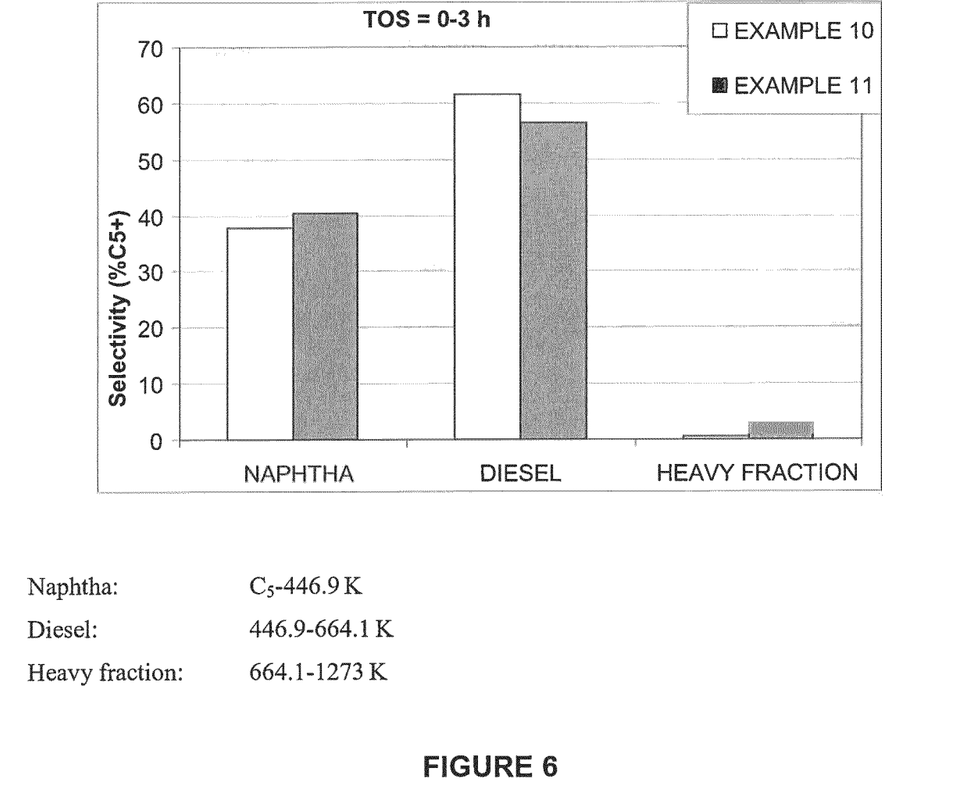
FIG. 6: shows the selectivity to different fractions in liquid products obtained with the zeolite catalyst described in Example 4, tested as described in Example 11, compared with that of the parent H-Theta-1 zeolite (Si/Al=25) tested as described in Example 10.

The variation of propylene conversion with time on stream (TOS) is shown in FIG. 5. The selectivity to different fractions in the liquid product recovered at the outlet of the reactor during the first three hours TOS is shown in FIG. 6.

EXAMPLE 11

The theta-1 zeolite catalyst of Example 4 was pelletized, crushed and sieved to a particle size of 0.2-0.4 mm. 0.5 g of this pelletized sample was diluted with silicon carbide (0.64 mm-0.25 mm) to obtain a bed volume of 4.0 cm$^3$. The mixture was loaded into a down-flow stainless-steel fixed bed reactor, and a $C3^=$:C3 feedstock (60:40 wt:wt) processed as described in example 5.

The variation of propylene conversion with time on stream (TOS) is compared with that of the corresponding protonic form in FIG. 5, and it can be seen that when 19 molar % of the proton sites are replaced by potassium cations the activity of the zeolite is considerably improved and the deactivation rate is lower than when the zeolite is fully in its hydrogen form. The selectivity to different fractions in the liquid product recovered at the outlet of the reactor during the first three hours TOS is shown in FIG. 6. From these results it can be seen that the selectivity values obtained with both samples are very similar.

The invention claimed is:

1. A process for producing a hydrocarbon fraction containing components boiling in the range typical for diesel fuel comprising contacting a feedstock at least partly derived from a refining process and comprising one or more $C_2$ to $C_{10}$ alkenes with a zeolite catalyst having partially neutralised acidity and a one-dimensional or two dimensional micropore structure consisting of channels made from rings containing between 10 and 12 silicon and/or aluminum atoms at a temperature in the range 373 to 773 K and pressure in the range 0.1 to 200 bar characterised in that the zeolite catalyst contains both protons and basic cations and is a TON zeolite; and producing diesel fuel from the hydrocarbon fraction; and
wherein the basic cation is selected from the group consisting of Group IA and Group IIA metal cations; and
wherein the basic cations occupy between 10 and 85% of the ion exchange sites in the partially neutralized zeolite catalyst; and
wherein the conversion of the feedstock to diesel fuel is greater than the conversion of the feedstock to diesel fuel with the TON zeolite that is not neutralized and conducted at the same temperatures and pressures.

2. A process according to claim 1, where the feedstock comprises one or more $C_3$ to $C_7$ alkenes.

3. A process according to claim 2, where the alkene is present in the feed in a concentration of from 25 to up to 100% by weight.

4. A process according to claim 1 wherein the partially neutralized zeolite catalyst has been further treated with oxalic acid or a hexafluorosilicate salt.

5. A process according to claim 1 carried out at a temperature from 423 to 623 K, a pressure from 5 to 80 bar and a weight hourly space velocity of from 0.25 to 50 $h^{-1}$.

6. A process according to any one of the preceding claims wherein the feedstock contains from 0.5 to 50 mole percent hydrogen.

* * * * *